United States Patent

[11] 3,597,069

[72] Inventor Russell M. Heinonen, Jr.
Hudson, Mass.
[21] Appl. No. 796,873
[22] Filed Feb. 5, 1969
[45] Patented Aug. 3, 1971
[73] Assignee Technical Operations Incorporated
Burlington, Mass.

[54] TV FILM REPRODUCTION SYSTEM COMPATIBLE WITH DIFFRACTION PROCESS COLOR PROJECTION SYSTEMS

5 Claims, 26 Drawing Figs.

[52] U.S. Cl. 353/20, 350/162, 353/84, 353/97
[51] Int. Cl. G03b 21/14, G02b 5/18
[50] Field of Search 353/20, 84, 97; 350/162 SF

[56] References Cited

UNITED STATES PATENTS 3,378,633 4/1968 Macovski 178/5.4
3,408,143 10/1968 Mueller 355/40
3,504,606 4/1970 Macovski 95/12.20

*Primary Examiner*—Leonard Forman
*Assistant Examiner*—Steven L. Stephan
*Attorneys*—Rosen and Steinhilper and John H. Coult

ABSTRACT: This disclosure depicts improved color television film reproduction systems capable of displaying either conventional color transparency cine film, or alternatively, by a diffraction process, cine records on which color separation information is stored as signals modulating separately detectable spatial carriers. The illustrated system comprises, inter alia, novel methods and apparatus making possible precise, rapid, and facile alignment of the optical systems in the projector and camera stages of the film reproduction system, and apparatus enabling rapid and simple conversion of the reproduction system from a conventional mode wherein color transparency film is used to a diffraction process mode wherein color-encoded monochrome film is used.

Russell M. Heinonen, Jr.
*Inventor*

*By* *Rosen & Steinhilper*
*and*
*John H. Coult*
*Attorneys*

Russell M. Heinonen, Jr.
*Inventor*
*By* *Rosen & Steinhilper*
*and*
*John H. Coult*
*Attorneys*

Russell M. Heinonen, Jr.
*Inventor*
*By* *Rosen & Steinhilper*
*and*
*John H. Coult*
*Attorneys*

Russell M. Heinonen, Jr.
*Inventor*
*By* *Rosen & Steinhilper*
*and*
*John H. Coult*
*Attorneys*

Russell M. Heinonen, Jr.
*Inventor*
*By* *Rosen & Steinhilper*
*and*
*John H. Coult*
*Attorneys*

TV FILM REPRODUCTION SYSTEM COMPATIBLE WITH DIFFRACTION PROCESS COLOR PROJECTION SYSTEMS

CROSS-REFERENCES TO RELATED APPLICATIONS

This application relates to copending applications Ser. Nos. 682,728, filed Nov. 7, 1967; 694,174, filed Dec. 28, 1967 now U.S. Pat. No. 3,546,374, issued Dec. 8, 1970; 697,267, filed Dec. 18, 1967; and 794,709, filed Jan. 28, 1969, now U.S. Pat. No. 3,549,237, issued Dec. 22, 1970, all assigned to the assignee of the present invention.

BACKGROUND OF THE INVENTION

This application concerns principles useful in the application of a particular diffraction process color system to commercial color television film reproduction systems. Diffraction process color systems have been investigated sporadically for many years. Carlo Bocca in his U.S. Pat. No. 2,050,417 (1936) describes a system wherein color separation diapositives are made with spatial carriers at different angles; the diapositives are then added on a common recording medium. Color information is retrieved from the colorless record thus formed by optically Fourier transforming the record and spectrally filtering the first order diffraction patterns consonant with the color separation information they carry. The patent states that upon retransformation of the Fourier transform distribution, a full-color aerial image is erected.

MOre recently, others have reinstigated studies of diffraction process color systems, as evidenced for example, by U.S. Pat. Nos. 3,378,633 and 3,378,634 issued in Apr. of 1968 to Albert Macovski. None of the literature on the subject evidences that any of the scientists investigating diffraction process color systems have consummated the mating of a diffraction process color projector with a commercial color TV film reproduction system of the parallel monochrome type. Among the obstacles in the path of such a development have been the following: 1. diffraction process color projectors have in the past produced insufficient luminous energy to meet the minimum threshold levels of commercial CRT pickup tubes; 2. images reproduced by prior art diffraction processes were of such marginal fidelity as to be incapable of withstanding degradation by the transfer functions of TV film reproduction systems; 3. diffraction process projectors in the prior art have not been such as to be compatible with film reproduction systems; and 4. the relevant branch of physical optics had not been developed to a state where it was capable of supporting the advanced technology required.

Also serious are the alignment problems associated with diffraction process color systems which inherently involve (if thermal sources only are considered) the generation and imaging of one or more very small (and therefore of relatively high spatial coherence) but intense sources of light.

OBJECTS OF THE INVENTION

It is an object of the invention to provide diffraction process apparatus useful in a color television film reproduction system for reproducing with high fidelity and brightness full-color displays from a monochrome record on which color information is impressed on spatial carriers; more particularly, it is an object to provide apparatus making possible precise, rapid, and facile alignment of optical systems in the projector and camera stages of such a film reproduction system.

It is another object of this invention to provide apparatus and methods useful in a parallel monochrome color TV film reproduction system for rendering such systems compatible to the display of conventional color transparencies or records on which color information is impressed on spatial carriers.

It is still another object to provide apparatus for expediting conversion of such a system between conventional and diffraction process modes of operation.

It is yet another object to provide a diffraction process projection system for use in a color TV film reproduction system which is highly stable in maintaining alignment.

Further objects and advantages of the invention will in part be obvious and will in part become apparent as the following description proceeds.

The features of novelty which characterize the invention will be pointed out with particularity in the claims annexed to and forming a part of this specification.

BRIEF DESCRIPTION OF THE DRAWINGS

For a fuller understanding of the invention, reference may be had to the following detailed description taken in connection with the accompanying drawings wherein.

Figures 1, 1A, 1B, 1C, 1D, 1E, 1F, 1G, 1H:
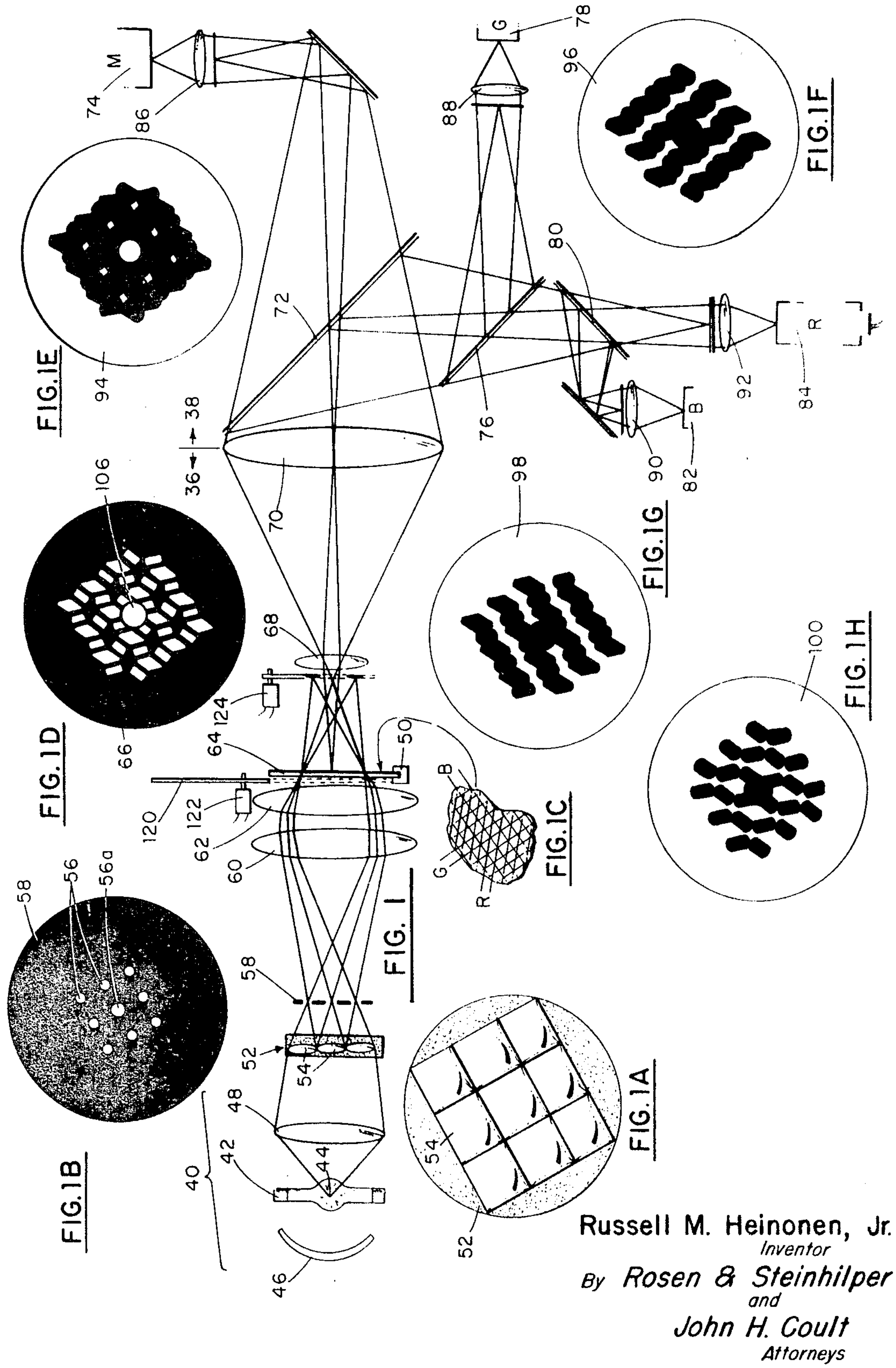
FIG. 1 is a schematic side elevation view of the optical system of a parallel monochrome color TV film reproduction system with which this invention is concerned.
FIG. 1A is a front elevation view of a rectangular array of condensing lenses shown in side elevation in FIG. 1.
FIG. 1B is a front elevation view of an apertured mask comprising part of light source means shown in FIG. 1.
FIG. 1C is a front elevation fragmentary view of a hypothetical monochrome record containing color separation information modulating azimuthally distinct spatial carriers.
FIG. 1D is a front elevation view illustrating a spatial filter located in a Fourier transform space established within the FIG. 1 optical projection system.
FIGS. 1E, 1F, 1G, and 1H represent front elevation views of light blocking masks for filtering light transmitted to monochrome, green, blue, and red detecting vidicon tubes, respectively, as taught by this invention. Each of FIGS. 1A—1H represent views of elements as they would appear if looking toward the light source.
Figure 2:
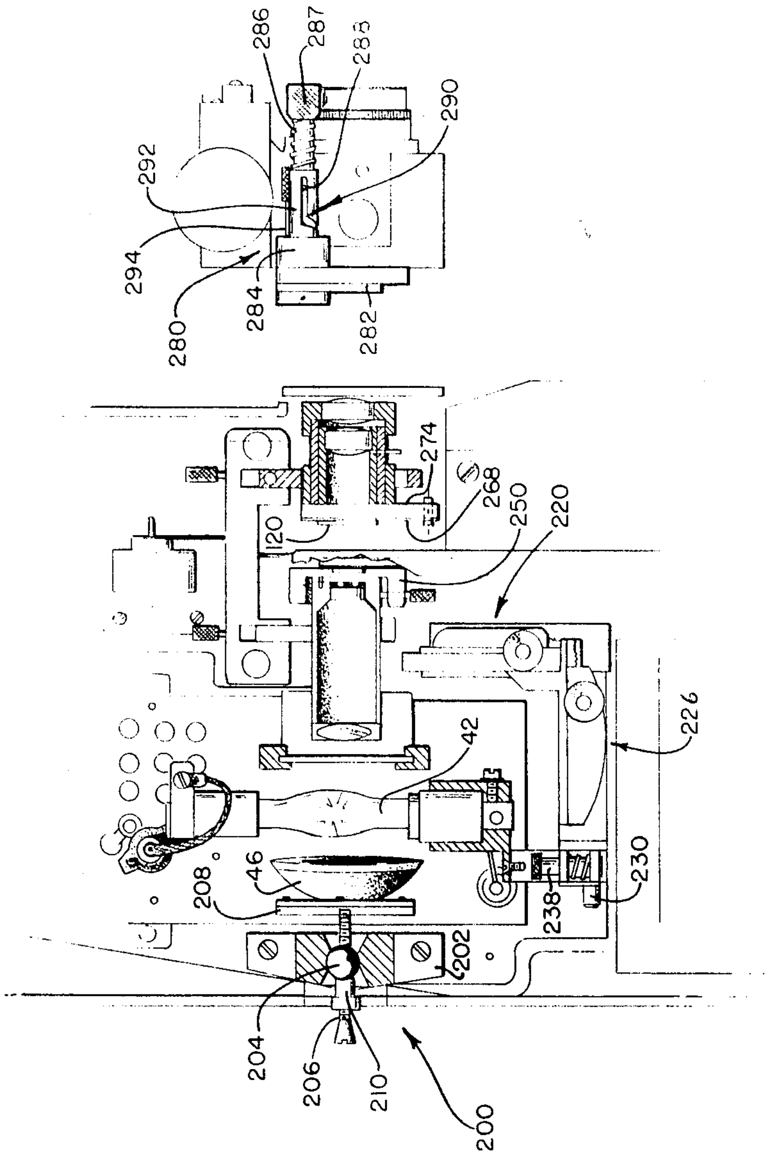
FIG. 2 is a side elevation assembly view of the projector stage of the FIG. 1 film reproduction system which illustrates alignment and manipulating apparatus constructed according to the teachings of this invention.
Figure 3:
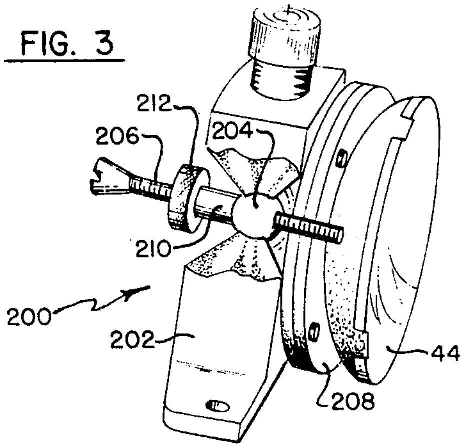
FIG. 3 is perspective view of a novel adjustable mirror mount shown in FIG. 2.
Figure 3A:
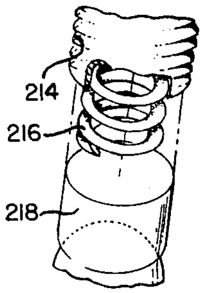
Figure 4:
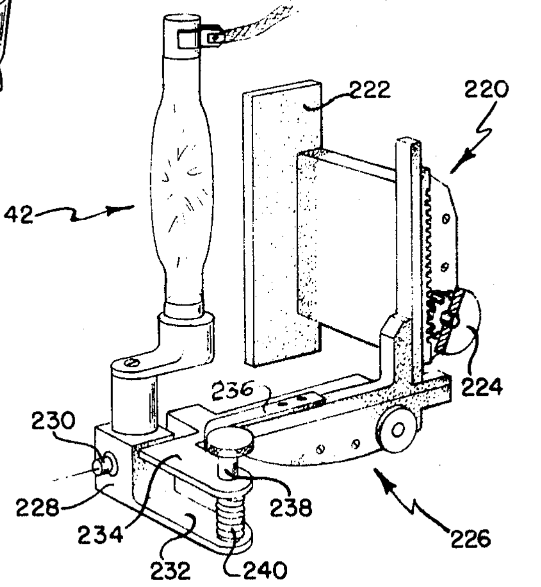
Figures 5, 5A:
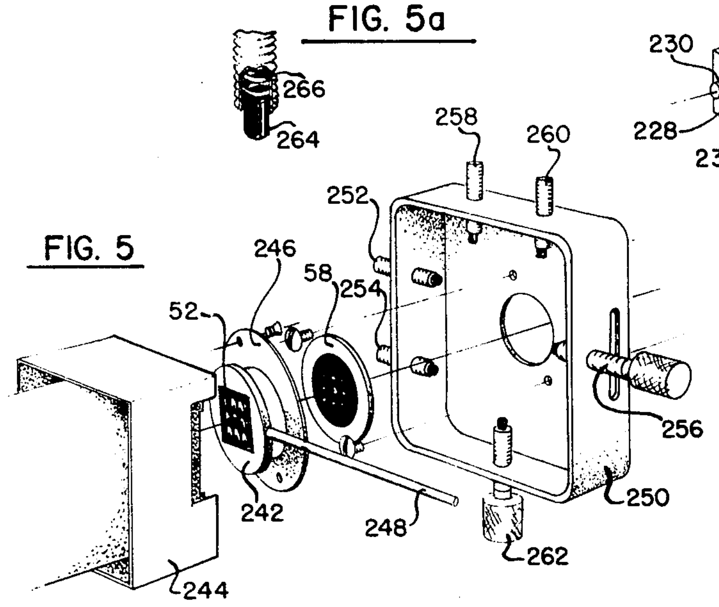
Figure 6:
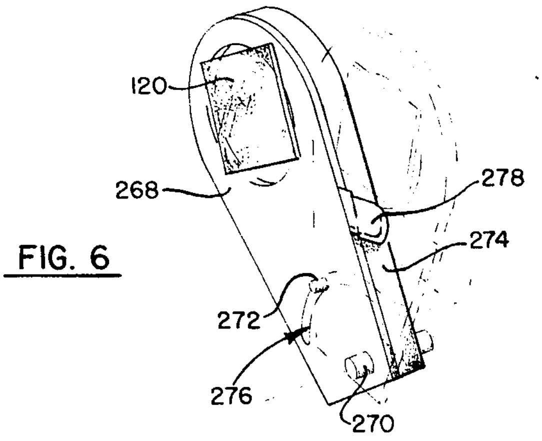
Figure 7:
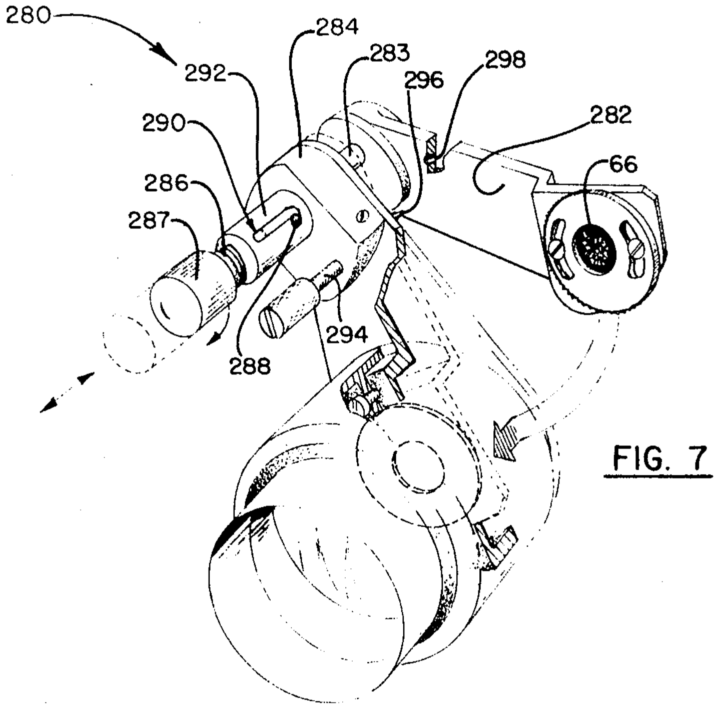
Figure 8:
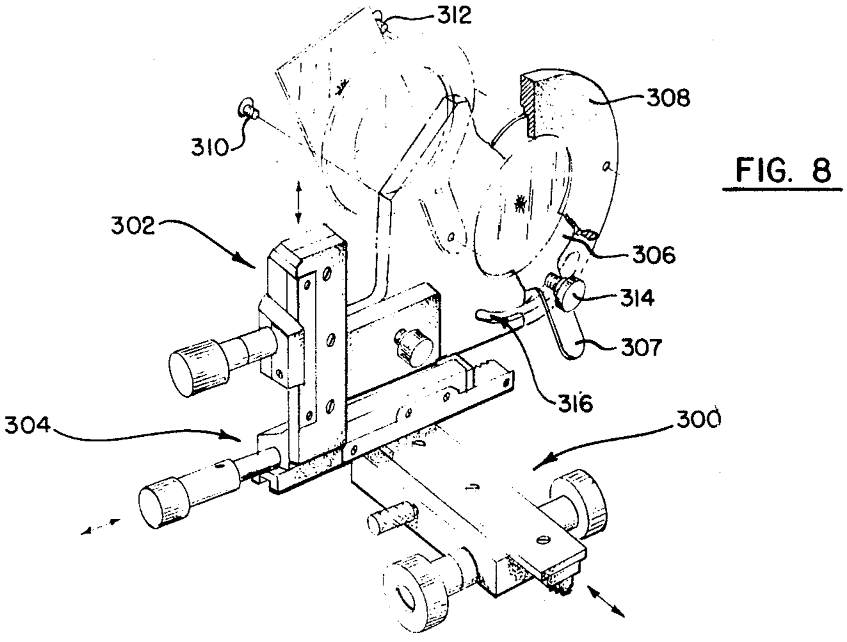
Figures 9, 10A, 10B, 10C, 10D, 11, 12, 13:
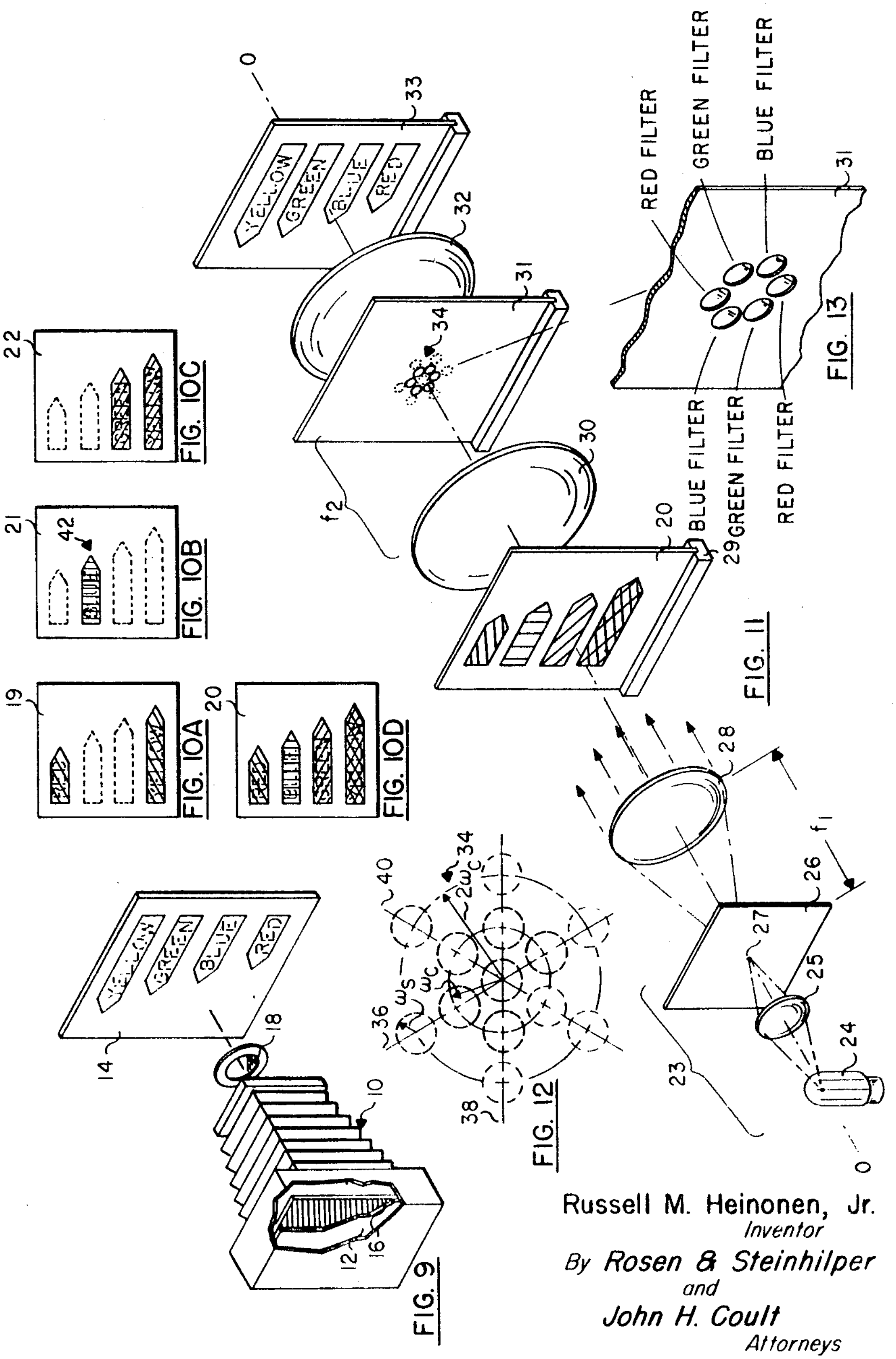

FIG. **3*a* is a detail of a portion of FIG. 3**;

FIG. 4 is a perspective view of novel lamp manipulating structure shown in section in FIG. 2;

FIG. 5 is an exploded perspective view of a novel light source subassembly shown in FIG. 2 which includes relatively adjustable lenticular and apertured mask elements;

FIG. **5*a* is a detail of a portion of FIG. 5**;

FIG. 6 illustrates a mount for positioning a diffuser element in an operative on the system optical axis or, alternatively, in an inoperative position off the system axis;

FIG. 7 shows in perspective mode conversion and alignment apparatus shown in FIG. 2;

FIG. 8 is a perspective view of alignment apparatus for adjusting the position of light blocking masks located in the camera stage of the film reproduction system—the masks are shown in FIGS. 1E—1H in FIG. 1;

FIG. 9 is a distorted scale schematic perspective view of a colored object and photographic camera which might be used for forming photographic records of the object in accordance with diffraction process spectral zonal photography; the view shows the camera partially broken away to reveal a photographic recording material and a diffraction grating which would be otherwise hidden within the interior of the camera;

FIGS. 10A—10D show individual and composite color separation records of the object being photographed, each of the individual records being associated with a particular zone of the visible spectrum and with a periodic modulation distinctive by its relative azimuthal orientation;

FIG. 11 is a distorted scale schematic perspective view of a prior art projection display apparatus for displaying photographic records of the above-described type;

FIG. 12 is a front elevation view, sch.. .atic and grossly simplified for ease of understanding, of a Fraunhofer diffraction pattern which might be formed in a Fourier transform space in the apparatus of FIG. 11; and FIG. 13 is a schematic view, enlarged and partially broken away, of a spatial and spectral filter shown in FIG. 11.

FIGS. 1—9 depict preferred implementations of the inventive concepts. However, before describing the invention, in order that it may be better understood, a brief discussion of the general nature of the diffraction process information storage and retrieval methods and structures with which this invention is involved, and the nature of the problems which exist in prior art display apparatus, will be first engaged.

Fig. 9 shows in very schematic form a photographic camera 10 which might be employed to form a spectral zonal spatially periodically modulated photographic record. The record may be formed as a composite of three separate color separation exposures of a photosensitive film 12 in the camera 10. The separate color separation records thus formed are respectively associated with a spatial periodic modulation, imposed for example, by a diffraction grating 16 adjacent the film 12, which is unique in terms of its relative azimuthal orientation.

FIG. 9 depicts the first step of a multistep operation for forming such a composite record. An object 14, illustrated as having areas of predominantly yellow, green, blue, and red spectral reflectance characteristics, as labeled, is photographed through a filter 18 having a spectral transmittance peak in the red region of the visible spectrum. A grating 16 having a line orientation sloping, for example, at 30° to the horizontal, from upper right to lower left (as the grating would appear if viewed from the back of the camera), is juxtaposed with the film 12 to effect a superposition of a shadow image of the grating 16 on the red light image of object 14. The resulting color separation record 19 associated with the red content in the object 14, processed to a positive, for example, by reversal processing techniques would appear as shown in FIG. 10A. The object appears inverted, of course, because of the property of the objective lens of rotating the image 180°. It is seen from FIG. 10A that the grating modulation is superimposed upon the object detail associated with light having a red spectral content. Note that because of the red constituent of yellow light, the yellow area in the object 14 is also imaged with superimposed grating lines of like angular orientation.

To complete the formation of a composite photographic record, as shown in FIG. 10D at 20, color separation exposures are then made successively through a filter having a spectral transmittance characterized by a blue dominant wavelength with a diffraction grating oriented vertically, and then finally through a filter having a spectral transmittance dominant in the green region of the spectrum with a diffraction grating having a grating orientation sloping from the upper left to lower right, for example, at 30° to the horizontal.

It is seen from FIG. 10B that the blue color separation record 21 does not result in the exposure of any part of the film 12 not associated with blue content in the object 14; however, an exposure to the object 14 through a green filter, the yellow area is again exposed with grating image superimposed thereon with an orientation associated with the green color separation record 22. Thus, as shown in FIG. 10D, the object area having yellow spectral content has superimposed thereon spatially periodic modulations associated with both the red and green color separation records.

Apparatus for displaying such a photographic record is known to the prior art and may take the form shown in FIG. 11. Such display apparatus includes a source 23 of light which is coherent at the record at the selected modulation frequency, illustrated as comprising an arc lamp 24, a condenser lens 25, and a mask 26 having an aperture 27 of restricted diameter. A lens 28 is provided for effectively transporting the point light source formed to a far field, either real or virtual. A film holder 29 for supporting a transparency record to be displayed, a transform lens 30 (explained below), a Fourier transform filter 31 (explained below), a projection lens 32, and a display screen 33 complete the display apparatus.

Upon illumination of composite record 20 in film holder 29, there will be produced three angularly displaced multiorder diffraction patterns, collectively designated by reference numeral 34 in FIG. 12. Each of the component diffraction patterns associated with a particular color separation record contains a zeroth order which is spatially coextensive with the zeroth order (undiffracted) components of each of the other patterns, and a plurality of higher order (diffracted) components each containing the related color object spatial frequency spectrum modulating a carrier having a frequency equal to a multiple of the grating fundamental frequency, the value of the multiple being a function of the diffraction order m.

By the use of transform lens 30 these diffraction patterns are formed within the confines of the projection system in a space commonly known as the Fourier transform space. It is thus termed because of the spatial and temporal frequency analysis which is achieved in this plane by diffraction and interference effects. Through the use of spatial and spectral filtering of these patterns in the transform plane, one or more of the discrete color separation records may be displayed. If all three color separation records are retrieved simultaneously, for example, a reconstitution of the original scene in true color is achieved.

The nature of the Fourier transform space and the effects that may be achieved by spatial filtering alone or by spatial and spectral filtering in this space of a selected diffraction order or orders may be understood by reference to FIG. 12. FIG. 12 shows three angularly separated diffraction patterns corresponding to the red, green, and blue light object spatial frequency spectra lying along axes labeled 36, 38, and 40, respectively. Each of the axes 36, 38, and 40 is oriented orthogonally to the periodic modulation on the associated color separation record. The diffraction patterns share a common zero order but have spatially separated higher orders.

By nature of diffraction phenomena, the diffraction angle $\alpha$ is:

$$\alpha=\lambda\omega$$

where $\lambda$ represents the spectral wavelength of the illumination radiation and $\omega$ represents spatial frequencies. Assuming the light at the film gate 29 to be collimated, the diffraction orders will be formed in the transform space at the delta function positions determined by the transform of the record modulation at radial distances from the pattern axis;

$$R=f_2 m\omega_c\bar{\lambda}$$

where $f_2$ is the focal length of lens 30; $\bar{\lambda}$ is the mean wavelength of the illuminating radiation; m represents the diffraction order; and $\omega_c$ is the fundamental grating frequency.

It should be understood that the FIG. 12 illustration of the diffraction patterns which might be formed is a gross simplification. In the interest of clarity and ease of understanding, the delimitation of the various diffraction orders has been represented as being circular. In reality, of course, the orders have no finite outline in transform space. The order boundaries indicated are merely isophotic lines connecting points of like energy level. In the real situation, the shape of the isophotic lines is determined by the light source shape, the envelope of the grating elements, and the scene or object recorded.

The first orders of each of the diffraction patterns can be considered as being an object spatial frequency spectrum of maximum frequency $\omega_x$ (representing a radius of the order) convolved with a carrier of spatial frequency $\omega_c$. The second order components can be thought of as being the convolution of an object spectrum having a maximum spatial frequency $\omega_x$ with a carrier having a spatial frequency of $2\omega_c$, and so forth. Thus, the various orders of each diffraction pattern may be thought of as being harmonically related, with a spatial frequency $\omega_c$, or an even multiple thereof, acting as a carrier for the spectrum of spatial frequencies characterizing the object detail. Two orders only are shown; however, it should be understood that even higher orders are present, but will be of increasingly less intensity.

Spatial filtering of the diffraction pattern is achieved by placing the apertured transform filter 31 in the transform space, as shown in FIG. 11. Since the zeroth order components of the diffraction patterns are spatially coextensive, the spatial frequencies contained in the zeroth order information channel represents the sum of the spectra respectively associated with each of the color separation records 19, 21, and 22. Thus, an opening in the transform filter 31 at the zeroth order location would result in a composite image of object 14 being formed in black, white, and tones of grey. Because the information channels associated with each of the color separation records are inseparably commingled in the zeroth order, they cannot be properly recolored to effect a faithful color reproduction of the photographed object. However, at the higher orders, because of the angular displacement of the red, blue, and green associated axes 36, 38, and 40, the proper spectral characteristic may be added to each of the information channels by appropriate spectral filtering.

FIG. 13 represents an enlargement of a central portion of filter 31, illustrating appropriate spatial filtering apertures with the correct spectral filters to effect a true color reproduction of the object. It should be understood, of course, that higher order components, appropriately spectrally filtered, could also be passed if desired. However, to maintain the discussion at a fundamental level, utilization of only the first order diffraction components has been illustrated.

Consider now a trace of the projection illumination as it traverses the projection system. The lamp 24 and condenser lens 25 are designed to evenly illuminate aperture 27 in mask 26 with a beam of maximum intensity broadband luminous energy. Lens 28 is shown spaced axially from mask 26 a distance substantially equal to its focal length in order that the light illuminating the film gate is substantially collimated. Transform lens 30 collects the substantially planar wave fronts in the zeroth order and diffracted higher orders and brings them to a focus in transform space in or near the aperture of the projection lens 32. The lenses 28 and 30 may be thus thought of as cooperating to image the illuminated aperture 27 in mask 26 on the transform filter 31.

It is evident that by prior art methods and apparatus, the display photographic records of the above-described type is hampered by the low levels of image brightness which may be obtained. One reason for the low image luminance concerns the requirement that the effective source must not exceed a predetermined maximum size to prevent overlap, and thus "-cross talk," between the diffraction orders. It is seen that the center of each of the higher orders of a diffraction pattern is spaced radially from the pattern axis by an integral multiple of the carrier frequency $\omega_c$ and that the radius of each of the orders corresponds to spatial frequency $\omega_x$. To prevent overlap between the zeroth and higher orders, $\omega_c$ must be greater than, or at least equal to $2\omega_x$. (This may be thought of as a version of the sampling theorem.) Since each diffraction order is an image of the illuminated aperture 27 in mask 26 magnified by the ratio $f_2/f_1$, it follows then that the diameter d of the aperture 27 in mask 26, and thus the total light flux transmissible through the aperture 27, is constrained in accordance with the relationship (assuming collimated light at the film gate 29);

$d = f_1 \bar{\lambda} \omega_c$ where $f_1$ represents the focal length of lens 28, and $\bar{\lambda}$ and $\omega_c$ are as indicated above.

The illuminance of the film gate by the collimator is:

$$E = \frac{Bd^2}{4f_1^2}\pi$$

where $B$ is the source photometric brightness (luminance) in candles/cm$^2$. Substituting for $d$ from above $$E = \frac{\pi B \bar{\lambda}^2 \omega_c^2}{4}$$

This relation clearly illustrates that an increase in the brightness of displayed images can be obtained by previous techniques only at the cost of increasing the source brightness $B$ or the grating frequency $\omega_c$.

As suggested, the schematic representation in FIG. 12 of the diffraction pattern of the record spatial frequencies formed in transform space is vastly simplified. It will be understood that because of the dependence of the diffraction angle on both spatial frequency and the wavelength of the illuminating radiation, the radial displacement in transform space from the pattern axis of carrier frequencies is different for each illuminating wavelength. Thus, the spectrum of spatial frequencies in the record diffracted by the long wavelength illuminating radiation will be centered about a spatial carrier spaced farther from the diffraction pattern axis than the record spatial frequency spectrum carried on a spatial carrier produced by shorter wavelength radiation.

Also, again because of the dependence of the diffraction angle on the wavelength of the illuminating radiation, the diameter of the diffraction orders for a given value of $\omega_x$ is dependent on the wavelength of the illuminating radiation.

It has been found that the bandwidth of record spatial frequencies available for retrieval actually is substantially greater than would be dictated by the sampling theorem; namely, a bandwidth of frequencies exceeding one-half of the spatial frequency of the sampling modulation. It should be appreciated from the above, however, that the bandwidth of spatial frequencies which may be detected by prior art spatial filtering techniques is appreciably less than one-half the sampling modulation frequency. There are a number of reasons for this. First, structural limitations are imposed on the spatial filter if the filter is to be formed, for example, by a photoetching process; a supporting web must be left between the openings passing the selected diffraction orders. An interstitial area between the orders is also necessary to allow for the spherical and longitudinal chromatic aberrations produced by the transform lens (lens 30 in the FIG. 11 system). Thus, the maximum bandwidth of spatial frequencies which may be detected by prior art techniques without introducing crosstalk is considerably less than one-half the spatial frequency of the sampling modulation impressed upon the record.

The above principles will aid in an understanding of the color TV film reproduction system with which this invention is concerned and the relationship of the subject invention with respect thereto. FIG, 1 depicts the optical system for the film reproduction system, comprising a projector stage 36 and a camera stage 38. Light source means for the system produce a plurality of sources of spatially coherent light for establishing a plurality of diffracted color channels and a source of less coherent light for establishing a luminance channel through the system, as more fully described hereinafter. To this end, light source means 40 comprises a projector lamp 42 having an arc 44 providing an intense source of luminous radiation of limited size. A spherical reflector 46 for collecting radiation from the arc 44 is disposed on the system axis and has its center of curvature at the arc 44. The reflector 46 is rotated slightly about an optical axis transverse to the system such that the image of the arc is displaced slightly from the arc itself, resulting in a substantial increase in average arc brightness.

A condensing lens 48 converges the light from the arc 44 toward the center of the film gate 50. A lenticular lens array 52 consisting (in the illustrated embodiment) of nine short focal length (for example, 7 mm.) spherical lenses arranged in a square geometry (see FIG. 1A). The lenses comprising the array 52 are illustrated as being truncated square and cemented together.

Converging light from the condensing lens 48 is received by the lenticular array 52, producing a square pattern of small arc images mating with and filling a corresponding array of pinholes 56 in mask 58 to produce nine sources of coherent light. FIG. 1B is a frontal view of mask 58. One of the pinholes **56*a*** is intentionally made larger than the other in order to establish a source of less coherent light, for reasons to be discussed hereinafter.

The light emanating from the pinholes 56 is collected by a collimating lens 60 and a transform lens 62 which produce a converging light bundle at the film gate 50. In the illustrated embodiment wherein the film gate 50 is illuminated with converging light, the film gate is effectively illuminated by nine virtual sources in the far field of the film gate. The gate may be illuminated with collimated light to produce an exact Fourier transform of a record 64 in the film gate 50 at a Fourier transform plane in the system, however, it has been found that the use of converging light is more efficient and the consequent formation of an approximate Fourier transform produces no degradation in the reconstructed images.

The Fourier transform of the record 64 is formed in a Fourier transform space located at the back focal plane of the transform lens 62. In the illustrated embodiment the record 64 contains green information modulating a spatial carrier whose direction vector is oriented at 26° to a horizontal 0°reference (looking toward the light source), red information modulating a spatial carrier whose direction vector is oriented at 71°, and blue information modulating a carrier whose direction vector is oriented at 116° (see FIG. 1C). Thus, the diffraction spectra associated with the green, red, and blue information will be diffracted in the transform space along axes oriented at 26°, 71°, and 116°, respectively. The particular orientation of the carrier vectors and projector components as described is not a part of this invention, but is an aspect of an invention of Edmund L. Bouche to be described and claimed in a separate patent application.

The arrangement of the lenticular array 52, mask 58, carriers, and lenses 60 and 62 are such that the fundamental harmonic orders carrying the red, blue, and green color separation information associated with each of the nine sources overlaps in the transform space. The overlap is such that first order red diffraction spectra produced by one source overlaps a first order red diffraction spectra produced by an adjacent source. Similarly, blue and green first order spectra are also caused to overlap in the transform space.

A spatial filter 66, shown in FIG. 1D, is effective to block the zeroth order DC information associated with each of the nine sources, except that produced by the central luminance channel source (for reasons to be described below), and to pass first order red, blue, and green color separation information with as little transmission of crosstalk as possible.

A projection lens 68 collects light transmitted through the spatial filter 66, forming an image of the record 64 at a field lens 70 constituting the input element for the color television camera stage 38 of the film reproduction system.

Within the TV camera stage 38 a beamsplitting mirror 72 amplitude divides the converging light bundle from the field lens 70, passing part of the beam to a high resolution monochrome vidicon tube 74 and reflecting the remaining portion of the light bundle to the color detection section of the camera. In the color detection section a first dichroic mirror 76 reflects green light to a green-detecting vidicon tube 78, transmitting blue and red light to a second dichroic mirror 80. The second dichroic mirror 80 reflects blue light to a blue-detecting vidicon 82, transmitting red light to a red-detecting vidicon tube 84. The record image formed by the projection lens 68 at the field lens 70 is reimaged onto the monochrome, green, blue, and red vidicon tubes 76, 78, 82, and 84 by lenses 86, 88, 90, 92, respectively. For reasons which will be fully described below, the field lens is color corrected and of extraordinary quality, serving to form images of the spatial filter 66 in front of the lenses 86, 88, 90, and 92, respectively, at the locations of which images are placed novel light blocking masks 94, 96, 98, and 100, shown individually in FIGS. 1E—1H. The construction and function of these light blocking masks will be treated in some detail below.

Signals generated within the vidicon tubes 74, 78, 82, and 84 are sent through leads to conventional signal processing circuitry (not shown) which performs the functions of amplification, matrixing, and other conventional electronic operations.

The subject color television film reproduction system has a distinct luminance information channel carrying a wideband of spatial frequencies available for processing in the camera chain separately from the channels associated with the color information. The provision of a wideband luminance channel enables the production of images of greater resolution, enhanced brightness, and higher signal-to-noise ratios than is possible if color channels alone are combined to produce luminance information.

It has been found that the use of a light source with high spatial coherence produces images having a random noise effect, appearing as a speckling on the displayed images. This speckling effect is a result of random amplitude and phase perturbations of the illuminating wave fronts due, inter alia, to random defects in the recording medium. The provision of a separate luminance channel having substantially less spatial coherence than the color channels has the advantage that the speckling effect is swamped by the addition of the more uniform luminance channel energy. In the disclosed system a wideband luminance channel is combined with a plurality of more spatially coherent channels transmitting color information on spatial carriers. Referring now to FIG. 1 and attendant FIGS. 1B and 1C, the combination of a luminance channel with a plurality of more spatially coherent channels is accomplished by providing an intensely illuminated pinhole **56*a* of substantially larger size than pinholes 56 in mask 58. Although the location and origin of the enlarged source is to a certain extent arbitrary, in the illustrated arrangement one of the pinholes 56 in mask 58** is enlarged to serve as a source of substantially less coherent light for the luminance channel.

There are number of factors which influence the decision as to which of the pinholes 56 shall be selected to provide the enlarged source for the wideband channel—among these are: sacrifice of color energy caused by necessary spatial filtering in the transform plane, utilization of the optimum modulation transfer functions of the system optical elements, and symmetry in the luminance and color channels. In the described system the desirability of maintaining an optimum net modulation transfer function (MTF) and minimizing vignetting leads to the selection of the central pinhole as the one which should be enlarged to provide the source for the luminance channel. FIG. 1B shows the enlarged central pinhole **56*a* in mask 58 implementing this choice. In the transform plane spatial filter 66 (see FIG. 1D) is provided with a large central aperture 106 for passing a bandwidth of spatial frequencies substantially greater than the bandwidth of any of the diffracted color channels transmitted through the array of apertures surrounding the central aperture 106**.

In the preferred embodiment of the invention concepts, means are provided for rendering unnecessary a any spectral filtering at the Fourier transform plane, as is required in the prior art systems (see especially FIG. 13), and for obviating the need for dichroic mirrors in the camera chain. The illustrated film reproduction system exploits the fact that the field lens 70 forms an image of the spatial filter 66 in front of each of the vidicons. By blocking with blocking masks 94, 96. 98, and 100 different portions of each of the filter images thus formed, each vidicon is caused to "see" only the color separation (or luminance) distribution which it is assigned to detect. FIGS. 1F, 1G, and 1H depict blocking masks 96, 98, and 100 designed to block all energy except the green color separation image, the blue color separation image, and the red color separation image, respectively. A comparison of the blocking masks 96, 98, and 100 with the spatial filter 66 will clearly indicate the manner in which the opaque mask patterns respectively absorb substantially all energy except that which defines the distribution which the associated vidicon is assigned to detect. The opaque mask patterns on the blocking masks represent partial images of the spatial filter 66 which are slightly enlarged in order to: 1. more effectively block crosstalk energy which would otherwise be transmitted, 2. allow for lens imperfections and 3. introduce some mechanical and alignment tolerances.

A similar blocking mask 94 (see FIG. 1E) blocks all color channel energy and transmits only the zeroth order luminance channel distribution to the monochrome vidicon tube 74.

Whereas it may be first impression appear that zeroth order color channel energy will be transmitted through clear areas on each of the blocking masks, it must be remembered that the spatial filter 66 prevents all zeroth order color channel energy from passing beyond the Fourier transform space.

The blocking masks may be fabricated in any of a great number of ways—one satisfactory method involves deposition of opaque patterns on a clear glass base material.

Thus, it becomes evident that although dichroic mirrors 76 and 80 as found in conventional parallel monochrome color television cameras may be utilized, they are rendered unnecessary by the use of blocking masks 94, 96, 98, and 100 and may be replaced by conventional beamsplitting mirrors.

It is desirable to have a compatible color TV film reproduction system which is capable of being used to reproduce images in color from either conventional color transparency records or monochrome records on which color separation information is carried on spatial carriers. By the utilization of blocking masks 94, 96, 98, and 100, which during projection of a conventional color transparency subtract only a small amount of energy which would otherwise reach the respective vidicon tubes, no alteration of the camera stage is necessary to convert from color transparency projection to diffraction process projection of monochrome records.

However, in the film projector, it is desirable to illuminate the film gate with diffuse incoherent light when color transparencies are projected. To this end, FIG. 1 shows a diffuser 120 mounted for rotation into or out of the system, as described in detail hereinafter. The system is shown in its operative mode for reproducing color images by diffraction process from a monochrome record. Thus, the diffuser 120 is shown in its inoperative position. The only other modification to the system to convert from one mode of operation to the other concerns the spatial filter 66. The spatial filter 66 is useful only in connection with diffraction process projection and would block a substantial amount of light if used during projection of conventional color transparencies. In accordance with this invention, means are provided for alternately positioning the filter 66 either within or without the system depending on whether conventional or diffraction process projection is desired, as described at length below.

DESCRIPTION OF THE PREFERRED EMBODIMENTS

This invention concerns apparatus incorporated in color TV film reproduction system as described for aligning and manipulating certain optical elements in the projector and camera stages. FIG. 2 represents a side elevation view of a portion of the projector assembly. FIGS. 3—7 show certain subassemblies in the FIG. 2 assembly. FIG. 8 illustrates manipulating and aligning apparatus incorporated in the camera stage (not shown in FIG. 2). Like reference numerals in the various figures of the drawings represents like elements.

One aspect of this invention concerns an adjustable mounting structure for the mirror 46. As discussed above, the optical projection system, when operating in a diffraction mode, creates a plurality of spatially coherent sources which are imaged and reimaged with a high degree of accuracy through the projector and camera stages. It is crucial that the location of the arc image formed by mirror 46 be very precisely controllable since the arc and its image are reimaged as a unit through the projector and camera optical systems. To this end, an adjustable mirror mount 200 is provided. The mirror mount is shown from an overhead perspective viewpoint in FIG. 3. The mount 200 comprises a frame 202 defining a spherical cavity for seating a spherical ball 204 of like radius. The ball 204 is internally threaded to receive a threaded shaft 206, providing for adjustment of the mirror 46 along the optical axis. One end of the shaft 206 carries a mounting plate 208 which supports the mirror 46. The opposite end of the shaft 206 is accessible for manual manipulation and includes a slotted head for receiving a screwdriver to effect the aforesaid axial adjustment of the mirror 46. An internally threaded lock nut 210 is carried on the shaft 206 and has a knurled head 212 facilitating manual rotation of the lock nut into locking engagement with the ball 204.

In accordance with this invention means are provided for applying a variable frictional force upon the ball 204: (1) to lock the ball (and thus the mirror 46) in the desired set position, and (2) to provide, while the mirror is being a adjusted, a moderate compressive force to the ball to greatly facilitate the adjustment operation. The illustrated means for producing this variable force on the ball 204 comprises a radially adjustable screw 214 carried in a bore in the frame 202, the screw 214 itself having an internal bore which receives a compression spring 216. A friction pad 218 carried in the bore in the frame 202 is biased by the spring 216 against the ball 204. By varying the radial setting of the screw 214, the pad 218 can be compressed against the ball 204 with sufficient force to seat the mirror in its desired operating position, and yet can be backed off sufficient to allow restricted movement of the mirror during alignment operations.

Because of the accuracy with which the arc and its image must be reimaged into the pinholes 56 in mask 58 (see FIG. 1) it is extremely desirable that the arc produced by the lamp 42 be capable of vertical, axial, and transverse positional adjustment. FIGS. 2 and 4 show apparatus for implementing such positional adjustments of the arc. A first linear translation device, illustrated as being a conventional rack and pinion mechanism 220, is anchored to the projector chassis 222 and includes a rotatable adjustment knob 224 for altering the vertical position of the lamp 42.

To provide for axial adjustment of the lamp a second linear translation device, again depicted by way of example as being a rack and pinion mechanism similar to the rack and pinion mechanism 220, is carried on the rack member of the mechanism 220. To provide for movement of the arc in planes transverse to the system axis, the lamp 42 is mounted on a carriage 228 which in turn is mounted for rotation about a shaft 230 carried by the rack member on the second rack and pinion mechanism 226. An arm 232 extending from the carriage 228 is substantially parallel with an arm 234 comprising part of a plate 236 affixed to rack and pinion mechanism 236. A manually adjustable screw 238 interconnects the free ends of arms 232 and 234 and carries a compression spring 240 for biasing the arms 232 and 234 apart. During an alignment operation, the arc may be adjusted vertically and axially by rotating the control knobs on the rack and pinion mechanisms 220 and 226, respectively; and the arc may be positioned in a plate transverse to the system optical axis by adjusting the screw 238 which has the effect of drawing the free end of arm 232 toward or away from the free end of arm 234 to produce a corresponding rotational movement of the arc.

To provide maximum flexibility and accuracy in the alignment of the projector optical system, it has been found necessary that some adjustability be built into the lenticular lens array 52 and the apertured mask 58. Referring particularly to FIG. 5, means are provided in accordance with this invention for adjusting the azimuthal orientation of the lenticular array 52 and for adjusting the vertical and horizontal position of mask 58. In the illustrated embodiment, azimuthal adjustment capability for the lenticular array 52 is provided by mounting the array 52 in a circular plate 242 which is captured in a recess in a holder 244 by an annular ring 246. A lever 248 extending radially from the plate 242 allows for manual alteration of the angular setting of the array 52.

To provide for vertical and horizontal adjustment of the mask 58 according to this invention a housing 250 carrying the mask 58 is adapted to partially surround holder 244 and be captured thereon. A set of opposing spring-loaded screws 252, 254, 256 provide for adjustment of the housing (and thus of the mask 58) in the horizontal direction; a similar set of screws 258, 260, and 262 provide for adjustment of the housing 250 in the vertical direction. Each of the screws has a hollow bore receiving a flanged plunger 264 which is biased outwardly by a spring 266. The springs 266 have a relatively high loading factor to provide stability in the setting of the housing 250. In operation, the housing 250 may be shifted horizontally by rotation of screw 256 and vertically by rotation of screw 262.

As discussed above, a diffuser 120 is positioned on the optical axis when the system is operating in a conventional mode of operation. The diffuser 120 must be retracted to an inoperative position off the optical axis when the system is converted to a diffraction process mode of operation. To facilitate the conversion operation, the diffuser may be carried upon a support member 268 mounted for rotation about a shaft 270. A lug 272 extending from a back plate 274 through an arcuate slot 276 in support member 268 provides a bistable support for the diffuser 120. A tab 278 carried by the support member 268 allows for manual retraction and insertion of the diffuser 120.

The other operation which must be performed when converting from one mode of operation to the other concerns the retraction or insertion of the spatial filter 66. In accordance with this invention an alignment and manipulation device 280 is provided for effecting a rapid, precise, and easy control of the spatial filter 66. To this end the filter 66 is mounted upon an arm 282 comprising part of the device 280. The arm 282 is carried on a shaft 283 which is journaled in a frame member 284. The shaft 283 is axially moveable against the bias provided by a spring 286 surrounding the shaft. The shaft 283 carries on its opposed end a knob 287 providing for axial and rotational manipulation of the arm 282, and thus of the spatial filter 66.

A lug 288 extending radially from the shaft 283 is received in an L-shaped slot 290 in a sleeve 292 surrounding the shaft to provide a detent action for supporting the arm alternatively in an operative position on the optical axis or in an inoperative position off the axis.

In order that the axial and transverse positions of the spatial filter 66 may be very accurately controlled, there is provided by this invention an axially adjustable screw 294 carried in the frame member 284 which has a convergent end 296 adapted to be received in a conically shaped aperture 298 in the arm 280. During manual movement of the spatial filter 66, as the filter is brought near its operative rest position on the optical axis the convergent end 296 of the screw 294 engages the aperture 298 to effect a very precise transverse positioning of the filter 66 with respect to the optical axis. To vary the setting of the spatial filter along the axis, it is necessary only to rotate the screw 294.

In the camera stage the only elements requiring adjustment are the blocking masks 94, 96, 98, and 100. Means are provided for effecting adjustment of the blocking masks in three orthogonal directions and also in azimuth. Referring now to FIG. 8, there is provided a conventional rack and pinion mechanism 300 for varying the axial position of the mask, another rack and pinion mechanism 302 for varying the position of the mask in one transverse dimension orthogonal to that produced by adjustment of mechanism 302, and a worm and rack mechanism 304, also conventional, for adjusting the position of the mask transverse to the optical axis in a direction orthogonal to that produced by adjustment of mechanism 302. A ring 306 having a radially extending arm 307 adapted for manual manipulation and carrying a blocking mask is loosely retained in an annular recess in a support plate 308 by a pair of screws 310 and 312. A locknut 314 carried by the radial arm 307 on the ring 306 is received in an arcuate slot 316, to lock the ring 306 at the desired azimuthal setting.

The invention is not limited to the particular details of construction of the embodiments depicted, and it is contemplated that various and other modifications and applications will occur to those skilled in the art. Certain changes may be made in the above-described process without departing from the true spirit and scope of the invention herein involved, and it is intended that the subject matter of the above depiction shall be interpreted as illustrative and not in a limiting sense.

What I claim is:

1. For use in an optical projection system for retrieving information from a record containing an image-wise signal modulating a spatial carrier, the combination comprising:
record support means;
light source means comprising at least one effectively far-field source of light which is spatially coherent at the record at the frequency of said carrier;
lens means for resolving in a Fourier transform space a diffraction pattern of a record in said record support means, said pattern representing an image of said light source;
spatial filter means located in said transform space for selectively passing through said transform space at least a portion of a diffracted order associated with said diffraction pattern; and
manipulating means for moving said spatial filter means between an inoperative position off the system optical axis and an operative position on the optical axis, comprising:
arm means carrying said spatial filter means on a free end thereof,
mounting means supporting said arm means for rotational movement,
means coupled to said arm means for providing rotational movement thereof between a position wherein said spatial filter element is inoperative and a position on said axis wherein said spatial filter means is operative,
means for holding said spatial filter means in either of said operative or inoperative positions, and
axial adjustment means for varying the axial position of said spatial filter element.

2. The apparatus defined by claim 1 wherein said axial adjustment means is an axially adjustable screw for varying the axial position of said spatial filter means.

3. For use in an optical projection system for retrieving information from a record containing an image-wise signal modulating a spatial carrier, the combination comprising:
means for establishing a source of luminous
energy; mirror means for collecting light from said source and for forming an image thereof contiguous to said source;
adjustable mirror mounting means for supporting said mirror means, comprising:
a shaft for supporting said mirror means on one end thereof,
a ball member having a spherical external surface area, said ball member having an internal passageway for receiving said shaft,
fastening means receivable on said shaft for locking said ball at selected positions on said shaft,
support means having a cavity with a spherical surface area of the same radius as said ball for seating said ball member, and
ball locking means including spring-biased means for frictionally engaging said ball and means operating on said spring-biased means for adjusting the compressive force applied by said spring-biased means to said ball; condensing lens means for collecting light from said source; an array of lenses in the light bundle from said condensing lens means for forming a like array of spaced images of said source; first support means providing rigid axial support for said array of lenses while providing for angular adjustment thereof;
mask means located in a plane in which said source images are formed, said mask means having an array of apertures coincident with the locations of said source images to establish a plurality of sources of spatially coherent light; and
second support means supported on external surface areas of said first support means and carrying said mask means, said second support means including adjustable means engaging said external surface areas of said first support means for adjusting the position of said second support means relative to said first support means in a plane transverse to said system optical axis;

lens means for resolving in a Fourier transform space a number of diffraction patterns of a record in said record support means, said patterns representing images of said light sources;

spatial filter means located in said transform space for selectively passing through said transform space at least a portion of a nonzeroth order associated with each of said plurality of light sources; and manipulating means for moving said spatial filter means between an inoperative position off the system optical axis and an operative position on the optical axis, comprising:

arm means carrying said spatial filter means on a free end thereof and having a shaft on the opposite end thereof, mounting means supporting said shaft for rotational movement, manually operable means coupled to said shaft for providing for axial and rotational movement of said shaft, spring means for biasing said shaft along said axis in a direction toward an operative rest position on said axis wherein said arm means engages abutting means, detent means for holding said spatial filter means in either of said operative or inoperative positions, and axial adjustment means carried by said mounting means and having a convergent end adapted for engagement with recess means in said arm means when said spatial filter means is appropriately positioned on said system optical axis.

4. A compatible optical projection system for displaying images recorded either as a conventional color transparency or as a record on which color separation information is stored as a signal modulating a spatial carrier, comprising:

a film gate for holding a record;

light source means comprising at least one effectively far-field source of light which is spatially coherent at the record at the frequency of said carrier;

lens means for resolving in a Fourier transform space a diffraction pattern of a record in said film gate, said pattern representing an image of said light source;

spatial filter means for insertion in said transform space for selectively passing through said transform space at least a portion of a diffracted order associated with said diffraction pattern;

projection lens means located behind said spatial filter means for collecting the light transmitted through said spatial filter means and for forming an image of said record at an output plane;

diffuser means for insertion in said system between said light source means and said film gate; and means for supporting said diffuser means and said spatial filter means such that when either is positioned in said system the other is excluded from the system, whereby said diffuser means may be inserted in said system and said spatial filter means removed therefrom when it is desired to project a conventional color transparency, and whereby said spatial filter means may be inserted in said system and said diffuser means removed therefrom when it is desired to project a record on which color information modulates a spatial carrier, said means supporting said spatial filter means comprising:

arm means carrying the spatial filter means to be m manipulated on a free end thereof, mounting means supporting said arm means for rotational movement, means coupled to said arm means for providing for rotational movement thereof between a position wherein said spatial filter means is inoperative and a position on said axis wherein said optical element is operative, means for holding said spatial filter means in either of said operative or inoperative positions, and axial adjustment means for varying the axial position of said spatial filter means.

5. For use in an optical system for retrieving information from a record containing an image-wise modulating a spatial carrier, the combination comprising:

a film gate for holding a record;

light source means comprising at least one effectively far-field source of light which is spatially coherent at the record at the frequency of said carrier;

lens means for forming in a Fourier transform space a diffraction pattern of a record in said film gate, said pattern representing an image of said light source;

means including lens means for forming a conjugate image of said diffraction pattern;

spatial filter means at the location of said conjugate image and having a predetermined geometrical light attenuation characteristic;

means supporting said spatial filter means for axial, transverse, and rotational movement, comprising:

first linear translation means for moving a first support means in a first direction, second linear translation means carried by said first support means for moving a second support means in a second direction orthogonal to said first direction, and azimuth adjustment means carried by said second support means for supporting said spatial filter means for rotational movement; and lens means for retransforming the spectra transmitted by said spatial filter means to form an image of said record having a predetermined spatial frequency content dependent upon said geometrical light attenuation characteristic of said spatial filter means.